C. F. MURDOCK.
Car-Starter.

No. 162,572.

2 Sheets--Sheet 1.

Patented April 27, 1875.

Witnesses:
Will H. Dodge
Donn Twitchell

Inventor:
C. F. Murdock
by Dodge & Son
Atty.

THE GRAPHIC CO. PHOTO-LITH. 39 & 41 PARK PLACE, N.Y.

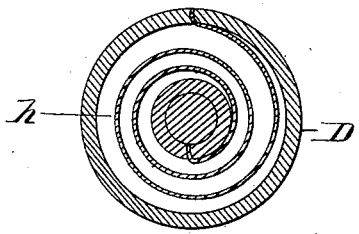
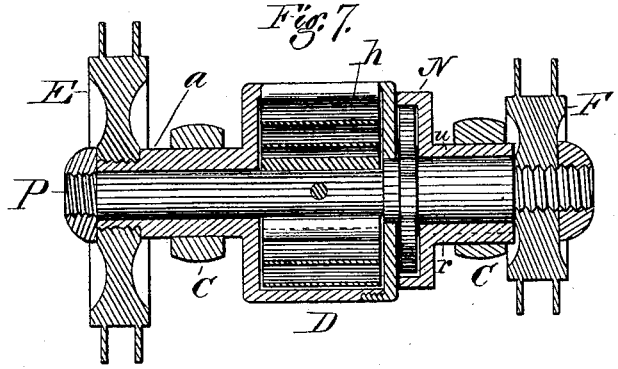

UNITED STATES PATENT OFFICE.

CHARLES F. MURDOCK, OF DETROIT, MICHIGAN.

IMPROVEMENT IN CAR-STARTERS.

Specification forming part of Letters Patent No. 162,572, dated April 27, 1875; application filed April 19, 1875.

*To all whom it may concern:*

Be it known that I, CHARLES F. MURDOCK, of Detroit, in the county of Wayne and State of Michigan, have invented certain Improvements in Car Starters and Brakes, of which the following is a specification:

My invention consists of a combination of devices to be applied to a car in such a manner that the application of the brake to the wheels shall set in motion mechanism for winding up a spring, which spring, when the brake is released, will exert its power in assisting to start the car, as hereinafter more fully described.

Figure 1:
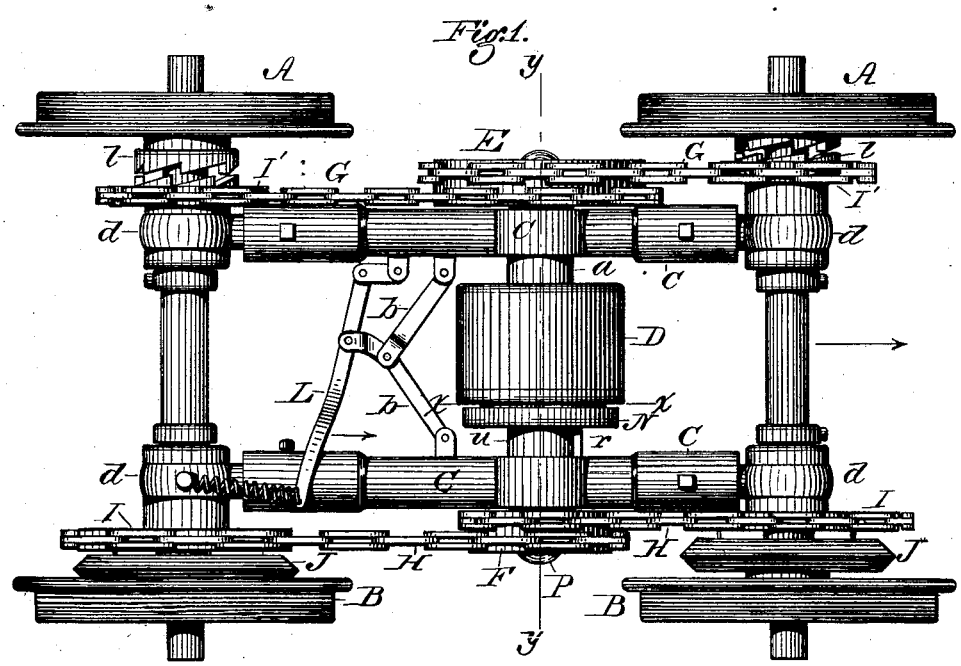

Figure 1 is a top-plan view of the apparatus applied to the running-gear of a street-car. Figs. 2, 3, 4, 5, 6, and 7 are sectional views, illustrating the construction of the parts.

Upon the axles of the car, at each side, I mount a sprocket-wheel, those on one side being about twice the size of those on the other side, as shown at I and I', Fig. 1. These sprocket-wheels are all provided with sleeves, which fit loosely on the axles, so they can be moved laterally to and from the wheels. To these sleeves are secured two bars, C, one at each side, extending from front to rear, the bars being connected to the sleeves by yokes $d$, which permit the sleeves to turn freely. Between these bars C I pivot two rods, $b$, and a lever, L, as shown in Fig. 1, so that when the lever is moved in the direction indicated by the arrow the rods $b$ will push the bars C asunder, thus forcing the sleeves of the sprocket-wheels I and I' outward toward the wheels on their respective sides. The sprocket-wheels I' are each provided with clutches $l$, to engage with corresponding clutches on the hubs of the wheels A, as shown in Fig. 1, while the sprocket-wheels I are provided with friction-clutches, to be hereinafter described, and which operate as brakes on the wheels B. About midway of the bars C is located a transverse shaft, P, upon one end of which is secured a sprocket-wheel, F, which is connected, by chains H, to the sprocket-wheels I, as shown in Fig. 1. Upon this shaft P is mounted loosely a drum, D, within which is secured a heavy spring, $h$, one end of which is fastened to the drum, and the other to the shaft P, as shown in Figs. 6 and 7. This drum D has a sleeve, $a$, which extends out through the bearing in bar C, and has secured firmly to its outer end a sprocket-wheel, E, which, in like manner, is connected to the sprocket-wheels I'. Upon the shaft P, alongside of the drum D, is mounted a clutch, to prevent the spring from unwinding, the construction of this clutch being shown in Fig. 4. It consists of a collar, $t$, secured firmly to the shaft P, and having fitted thereto three arms, $n$, the outer faces of which are arranged to slide loosely within a case, N, when moved forward, but which will brace against it, and lock fast when turned in the opposite direction, there being springs $o$ arranged to keep these arms $n$ pressed forward, thus holding them out close to the case, so that they will readily engage therewith. The case N, as shown in Fig. 7, is secured to the bar C by a sleeve, $u$, and key or feather $r$, so that it cannot turn, but is held rigidly in position.

It will thus be seen that whenever there is any tendency of the spring to unwind, the arms $n$, which move with the shaft P, to which the inner end of the spring is attached, will at once lock against the stationary case N, and prevent the spring from unwinding.

Figures 2, 3:
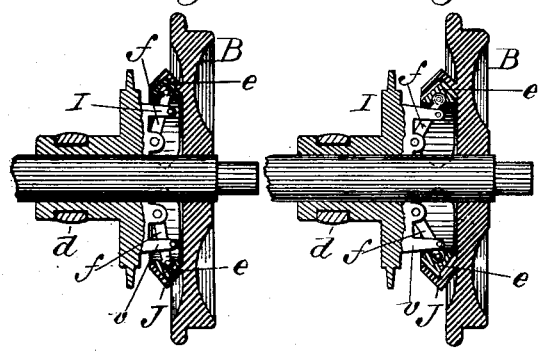
Figure 4:
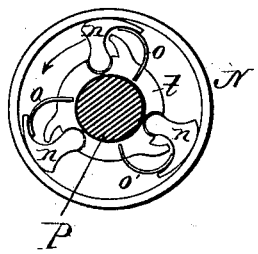
Figure 5:

The friction-brake used on the wheels B is shown in Figs. 2 and 3. As shown in Figs. 1, 2, and 3, there is upon the inner face of the wheels B a concave flange or projection, J, which is V-shaped in cross-section, and within this is fitted two semicircular blocks, $e$, which have their outer faces of a shape to correspond with the V-shaped groove within the flanges J, as shown in Figs. 2 and 3. These blocks $e$ rest upon the ends of arms $f$, which stand inclined inward, and have their lower ends pivoted in suitable bearings to the outer face of the sprocket-wheels I, there being slatted arms $n$ to keep them in position.

It will be seen that whenever the sprocket-wheels I are forced up toward the wheels the arms or levers $f$ will have their lower ends shoved outward, thereby crowding the friction-blocks $e$ outward into the cavity of the flanges J, and creating great friction.

By means of these friction-brakes the sprocket-wheels I will be engaged with the wheels B, and made to turn therewith, and the wheels I, through the medium of chains H, will impart motion to the shaft P, thereby winding up the spring h.

The operation is as follows: When it is designed to stop the car the lever L is operated, (it being connected by a rod or chain to a shaft on the platform, in the usual manner, but not shown in the drawing,) which will force the bars C asunder, thereby causing the friction-brakes to engage with the wheels B, and imparting motion to the sprocket-wheels I, and they in turn will set in motion the sprocket-wheel F on shaft P, which will wind up the spring h. At the same time, the spring, operating on the drum D, will set it in motion, by which it will commence to unwind the spring; but as the wheel F, which winds it, is made to revolve at a greater speed than the wheel E does, because of the difference in size of the wheels I and F, and as the wheels I' are prevented, by the clutches l, from turning any faster than the wheels A, the spring will be wound up faster than it unwinds, thus imparting to the spring a constantly-increasing tension until the car is stopped, or until the strain of the spring is sufficient to cause the blocks e to slip within the flanges J, which will cause them to operate as a brake on the wheels, thereby stopping the car. It will thus be seen that, when the car is stopped, the spring will be wound up, and that, consequently, as soon as the break is released, the spring will exert its full force, through the medium of the drum D, sprocket-wheel E, chains G, and clutches l, on the wheels A, to assist in starting the car. By these means I am enabled to utilize the force used in stopping the car to wind up the spring, which in turn exerts its force to assist in starting the car again. It is obvious that the relative size of the several sprocket-wheels may be varied to any desired extent, thus winding up the spring more or less rapidly. So, too, it is obvious that, by connecting the levers f to a stationary support, this friction-device may be used as a brake, to be applied to ordinary cars. In such cases, instead of connecting the concave flange J to the side of the wheels, it may be made separate, and secured rigidly to the axle, as represented at the right-hand end of Fig. 1, where it is so arranged in order to bring the sprocket-wheel I in line with the inner portion of wheel F, with which it is connected.

I have shown the sprocket-wheels and chains duplicated, in order to represent the application of my improvements to both axles; but it is obvious that they may be applied to one only, if desired, the mode of operation being the same.

One great advantage of this break for throwing the spring-winding mechanism into gear is, that it avoids the jar and jerking incident to the use of cog-gearing, and there is much less liability of breakage—the teeth of cog-wheels being almost certain to be broken when used for such a purpose, unless made exceedingly heavy and clumsy; besides which cog-gear, when thus used, creates a loud and disagreeable noise.

Having thus described my invention, what I claim is—

1. The combination of concave flange J, the friction-blocks e, pivoted levers f, and laterally-sliding disk, all substantially as and for the purpose set forth.

2. The combination of the bars C, capable of lateral motion with the levers L and b, car-axles, brake, and clutch, substantially as set forth.

3. The shaft P, in combination with the drum D, spring h, and friction-clutch for preventing the spring from unwinding, all substantially as set forth.

4. The combination of the sliding bars C, with the sprocket-wheels and chains, the drum, with its spring and clutch, the friction brakes and clutches, and the axles and wheels of a car, all substantially as and for the purpose set forth.

CHARLES F. MURDOCK.

Witnesses:
JOHN W. FRAZEE,
WALTER RYAN.